(12) United States Patent
Han et al.

(10) Patent No.: US 11,917,149 B2
(45) Date of Patent: *Feb. 27, 2024

(54) METHOD FOR CONSTRUCTING TILE STRUCTURE AND APPARATUS THEREFOR

(71) Applicant: INDUSTRY ACADEMY COOPERATION FOUNDATION OF SEJONG UNIVERSITY

(72) Inventors: Jong-Ki Han, Seoul (KR); Jae-Yung Lee, Gwacheon-si (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 75 days.

This patent is subject to a terminal disclaimer.

(21) Appl. No.: 17/681,879

(22) Filed: Feb. 28, 2022

(65) Prior Publication Data

US 2022/0394251 A1 Dec. 8, 2022

Related U.S. Application Data

(63) Continuation of application No. 16/642,414, filed as application No. PCT/KR2018/009983 on Aug. 29, 2018, now Pat. No. 11,297,317.

(30) Foreign Application Priority Data

Aug. 31, 2017 (KR) .................. 10-2017-0110978

(51) Int. Cl.
| | | |
|---|---|---|
| *H04N 19/119* | (2014.01) | |
| *H04N 19/129* | (2014.01) | |
| *H04N 19/174* | (2014.01) | |
| *H04N 19/176* | (2014.01) | |

(52) U.S. Cl.
CPC ......... *H04N 19/119* (2014.11); *H04N 19/129* (2014.11); *H04N 19/174* (2014.11); *H04N 19/176* (2014.11)

(58) Field of Classification Search
CPC .. H04N 19/119; H04N 19/129; H04N 19/174; H04N 19/176; H04N 19/136
See application file for complete search history.

(56) References Cited

U.S. PATENT DOCUMENTS

2014/0301464 A1* 10/2014 Wu ............... H04N 19/436
375/240.15

* cited by examiner

*Primary Examiner* — Nam D Pham
(74) *Attorney, Agent, or Firm* — McLean IP Global; Jason Y. Pahng

(57) ABSTRACT

The present invention discloses a method for constructing a tile structure, wherein a current picture includes at least two or more tiles, the at least two or more tiles are split by a column splitting and a row splitting, at least one or more of the column splitting and the row splitting are performed by using a splitting length which is shorter than a width length or a height length of the current picture.

3 Claims, 20 Drawing Sheets

| pic_parameter_set_rbsp( ) { | Descriptor |
|---|---|
| ... | |
| tiles_enabled_flag | u(1) |
| entropy_coding_sync_enabled_flag | u(1) |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
| } | |
| ... | |
| rbsp_trailing_bits( ) | |
| } | |

*FIG. 4*

| pic_parameter_set_rbsp( ) { | Descriptor |
|---|---|
| ... | |
| tiles_enabled_flag | u(1) |
| entropy_coding_sync_enabled_flag | u(1) |
| if( tiles_enabled_flag ) { | |
| 21 — first_tile_split_direction | u(1) |
| 22 — num_tile_in_dir_minus1 | ue(v) |
| for( i = 0; i < num_tile_in_dir_minus1; i++ ) | |
| 23 — tile_size_minus1[ i ] | ue(v) |
| for( i = 0; i < num_tile_in_dir; i++ ){ | |
| 24 — tile_split_flag[ i ] | u(1) |
| if( tiles_split_flag[ i ] ) | |
| 25 — tile_adpative_split(tile_split_direction ) | |
| } | |
| loop_filter_across_tiles_enabled_flag | u(1) |
| } | |
| ... | |
| rbsp_trailing_bits( ) | |
| } | |

| 25 — tile_adpative_split( parent_tile_split_direction) { | Descriptor |
|---|---|
| 26 — num_tile_in_dir_minus1 | ue(v) |
| for( i = 0; i < num_tile_in_dir_minus1; i++ ) | |
| 27 — tile_size_minus1[ i ] | ue(v) |
| for( i = 0; i < num_tile_in_dir; i++ ){ | |
| 28 — tile_split_flag[ i ] | u(1) |
| if( tiles_split_flag[ i ] ) | |
| 29 — tile_adpative_split(tile_split_direction ) | |
| } | |
| } | |

*FIG. 10*

| pic_parameter_set_rbsp( ) { | Descriptor |
|---|---|
| ... | |
|    tiles_enabled_flag | u(1) |
|    entropy_coding_sync_enabled_flag | u(1) |
|    if( tiles_enabled_flag ) { | |
|       num_tile_columns_minus1 | ue(v) |
|       num_tile_rows_minus1 | ue(v) |
|       uniform_spacing_flag | u(1) |
|       if( !uniform_spacing_flag ) { | |
|          for( i = 0; i < num_tile_columns_minus1; i++ ) | |
|             column_width_minus1[ i ] | ue(v) |
|          for( i = 0; i < num_tile_rows_minus1; i++ ) | |
|             row_height_minus1[ i ] | ue(v) |
|       } | |
|       for( i = 0; i < num_tile_in_picture; i++ ){ | |
|          tile_merge_flag[ i ] | u(1) |
|          if( tile_merge_flag[ i ] ){ | |
|             num_merge_tile_minus1 | ue(v) |
|             for( j = 0; j < num_merge_tile_minus1+1; j++ ){ | |
|                target_tile_ID[ j ] | ue(v) |
|             } | |
|       } | |
|       loop_filter_across_tiles_enabled_flag | u(1) |
|    } | |
| ... | |
|    rbsp_trailing_bits( ) | |
| } | |

41 → tile_merge_flag[ i ]
42 → num_merge_tile_minus1
43 → target_tile_ID[ j ]

*FIG. 13*

| pic_parameter_set_rbsp( ) { | Descriptor |
|---|---|
| ... | |
| tiles_enabled_flag | u(1) |
| entropy_coding_sync_enabled_flag | u(1) |
| if( tiles_enabled_flag ) { | |
|   num_tile_in_picture_ minus1 | ue(v) |
|   for( i = 0; i < num_tile_in_picture_minus1; i++ ){ | |
|     tile_start_ctb_adrres_in_picture[ i ] | ue(v) |
|     column_width_minus1[ i ] | ue(v) |
|     row_height_minus1[ i ] | ue(v) |
|   } | |
|   loop_filter_across_tiles_enabled_flag | u(1) |
| } | |
| ... | |
| rbsp_trailing_bits( ) | |
| } | |

(51 → num_tile_in_picture_minus1; 52 → tile_start_ctb_adrres_in_picture[ i ]; 53 → column_width_minus1[ i ]; 54 → row_height_minus1[ i ])

*FIG. 16*

Tile 0 | Tile boundary | Tile 1

| 0 | 1 | 2 | 15 | 16 | 17 | 18 | 19 |
|---|---|---|----|----|----|----|----|
| 3 | 4 | 5 | 20 | 21 | 22 | 23 | 24 |
| 6 | 7 | 8 | 25 | 26 | 27 | 28 | 29 |
| 9 | 10 | 11 | 30 | 31 | 32 | 33 | 34 |
| 12 | 13 | 14 | 35 | 36 | 37 | 38 | 39 |

Tile 0 | Tile boundary | Tile 1

| 0 | 5 | 10 | 15 | 16 | 18 | 21 | 25 |
|---|---|----|----|----|----|----|----|
| 1 | 6 | 11 | 17 | 19 | 22 | 26 | 30 |
| 2 | 7 | 12 | 20 | 23 | 27 | 31 | 34 |
| 3 | 8 | 13 | 24 | 28 | 32 | 35 | 37 |
| 4 | 9 | 14 | 29 | 33 | 36 | 38 | 39 |

| pic_parameter_set_rbsp( ) { | Descriptor |
|---|---|
| ... | |
| tiles_enabled_flag | u(1) |
| entropy_coding_sync_enabled_flag | u(1) |
| 71 — adaptive_ctb_scan_in_tile_flag | u(1) |
| if( tiles_enabled_flag ) { | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1; i++ ) | |
| column_width_minus1[ i ] | ue(v) |
| for( i = 0; i < num_tile_rows_minus1; i++ ) | |
| row_height_minus1[ i ] | ue(v) |
| } | |
| if( adaptive_ctb_scan_in_tile_flag ) { | |
| for( i = 0; i < num_tile_in_pic; i++ ) | |
| 72 — scan_dir_in_tile[ i ] | ue(v) |
| } | |
| loop_filter_across_tiles_enabled_flag | u(1) |
| } | |
| ... | |
| rbsp_trailing_bits( ) | |
| } | |

*FIG. 20*

METHOD FOR CONSTRUCTING TILE STRUCTURE AND APPARATUS THEREFOR

CROSS-REFERENCES TO RELATED APPLICATION

The present application is a continuation application of U.S. patent application Ser. No. 16/642,414, filed on Feb. 27, 2020, which is hereby incorporated by reference in its entirety. In addition, the patent application Ser. No. 16/642,414 is a U.S. national stage application of PCT/KR2018/009983, filed on Aug. 29, 2018, which is hereby incorporated by reference in its entirety. In addition, this application claims priority from Korean application number 10-2017-0110978, filed on Aug. 31, 2017, which is herein incorporated by reference in its entirety.

BACKGROUND OF THE INVENTION

1. Field

The present invention relates to a method for constructing a tile structure and an apparatus therefor, and more particularly, to a method for constructing a tile structure having various types, and apparatus therefor.

2. Description of the Related Art

Recently, the demand for high resolution, and high quality pictures such as HD (High Definition) pictures and Ultra High Definition (UHD) pictures is increasing in various applications. As picture data becomes high resolution and high quality, the amount of data relatively increases as compared with the existing picture data. Therefore, when a picture data is transmitted by using a medium such as a conventional wired/wireless broadband line or stored by using an existing storage medium, transmission cost and storage cost will increase. High-efficiency picture compression techniques may be used to solve these problems caused by high resolution and high quality picture data.

In video compression techniques, motion prediction is used to remove temporal redundancy between successive pictures. In order to detect temporal redundancy, the motion of the current block is predicted by using a plurality of reference pictures, and motion compensation is performed to generate a predicted block. The motion information includes at least one reference picture index and at least one motion vector. In addition, in order to obtain motion information, the current block may obtain spatial motion information candidates and/or temporal motion information candidates from spatial neighboring blocks and/or temporal neighboring blocks.

Also, in HEVC, a technique called as a tile partitioning method is employed, which splits an image into rectangular regions (tiles) and independently performs encoding and decoding of individual regions. As described above, since the amount of data increases as the current image becomes higher resolution and higher quality, it is necessary to study a method of adaptively coding an image by utilizing a large amount of data in a part of the image as needed. To this end, the utilization of coding of a video signal using a tile may be increased, and an improvement on coding using such a tile may also be required.

The object to be realized by the present invention is to provide a tile structure configuration method and apparatus thereof to improve the coding efficiency of an image by configuring a tile having a structure of various types.

In addition, another object of the present invention is to provide a method for configuring a slice in a tile and an apparatus thereof, in which a plurality of slices constituting a tile have various types of structures, thereby improving coding efficiency.

In addition, another object of the present invention is to provide a method and apparatus thereof for constructing a slice in a tile that improves coding efficiency by scan the coding tree blocks and/or coding blocks in a tile according to an adaptively changeable order.

SUMMARY OF THE INVENTION

In a method for constructing a tile structure according to an embodiment of the present invention for solving the above problems, the current picture includes at least two or more tiles, the at least two or more tiles are split by a column splitting and a row splitting, at least one or more of the column splitting and the row splitting may be split by using a splitting length of at least one of which is shorter than the height length or the width length of the current picture.

In one embodiment, the method may include a step for determining the column splitting and the row splitting by using at least any one or more of a tile number information, a tile size information, a split direction information, a split region number information, a tile merge flag information, a tile merge number information, a tile index information, a tile position in formation, a tile width size information, and a tile height size information.

Further, the step for determining the column splitting and the row splitting may include: a step for dividing the current picture into at least two or more tiles by receiving the split direction information and the first split region number information; a step for receiving a second split region number information for each of the split tiles; and a step for subdividing the split tiles in a direction perpendicular to the split direction indicated by the dividing direction information, based on the second split region number information.

In one embodiment, the step for subdividing the split tile is repeated, and the step for subdividing may subdivide the tile in a direction perpendicular to the direction split in the previous splitting step. Further, the step for determining of the column splitting and the row splitting may include: a step for firstly dividing the current picture into at least two or more tiles by using the split direction information and the split region number information; and a step for merge at least two or more tiles of the firstly split tiles by using at least one or more of the tile merge flag information, the merge number information, and the tile index information.

The step for determining of the column splitting and the row splitting may include: a step for receiving the tile number information indicating the number of tiles to be split in the current picture; and a step for receiving the tile position information indicating the position of the tile indicated by the tile number information, the tile width size information indicating the width of the tile, and the tile height size information indicating the tile height size information.

In an embodiment, the method of the present invention includes a step for splitting the current picture into at least two or more tiles by using the tile number information, the tile position information, the tile width size information, and the tile height size information.

According to another embodiment of the present invention for realizing another object, there is provided a method for configuring a slice in a tile, wherein at least one or more tiles included in the current picture include at least two or more slices, and a boundary of the slice may be a vertical direction or a diagonal direction.

In one embodiment, the tile may have a variable scan order for each tile, and the variable scan order may be any one of a raster scan, a vertical scan, a horizontal scan, a diagonal scan, and a predetermined scan, and applied to a coding tree block included in the tile, and the variable scan order may be different for each tile.

Further, in one embodiment, the variable scan order may be dependent on the split direction of at least two or more slices of the tile, or independent of the split direction of at least two or more slices of the tile.

According to another embodiment of the present invention to realize another object, there is provided a decoding method of a coding tree block, wherein a current picture includes a plurality of coding tree blocks, the coding tree block includes a plurality of coding blocks, and the decoding order of the coding blocks can be determined for each of coding tree blocks.

In one embodiment, at least one or more tiles included in the current picture may include at least two or more slices, and a decoding order of the coding blocks may depend on a split direction of a slice in the tile.

According to an embodiment of the present invention, the present invention provides a method of constructing a tile structure, which configure tiles having various types of structures to improve coding efficiency of an image, and in which at least two or more tiles included in the current picture are split by using a column splitting or a row splitting, which is at least one or more splitting lengths shorter than the vertical or width length of the current picture, and an apparatus thereof.

In addition, according to another embodiment of the present invention, there is provided a method of configuring a slice in a tile and an apparatus thereof in which a coding efficiency may be increased by determining the boundaries of at least two or more slices constituting a tile in the vertical or diagonal direction, and a coding efficiency is improved according to a picture by scanning the coding tree blocks or the coding blocks for respective tile according to an adaptive scanning method.

BRIEF DESCRIPTION OF THE DRAWINGS

FIG. 4 is a syntax for configuring a tile of a current picture according to a general method.

FIG. 10 is a syntax for configuring a tile structure.

FIG. 13 is a syntax for configuring the tile structure.

FIG. 16 is a syntax for configuring the tile structure.

FIG. 19B illustrates a scan order of a coding tree block in a plurality of tile structures configured according to a general method.

FIG. 19C illustrates a scan order of adaptive intra-tile coding tree blocks according to an embodiment of the present invention.

FIG. 20 is a syntax for constructing a tile having an adaptive scan order according to an embodiment of the present invention.

DETAILED DESCRIPTION OF THE INVENTION

Figure 1:
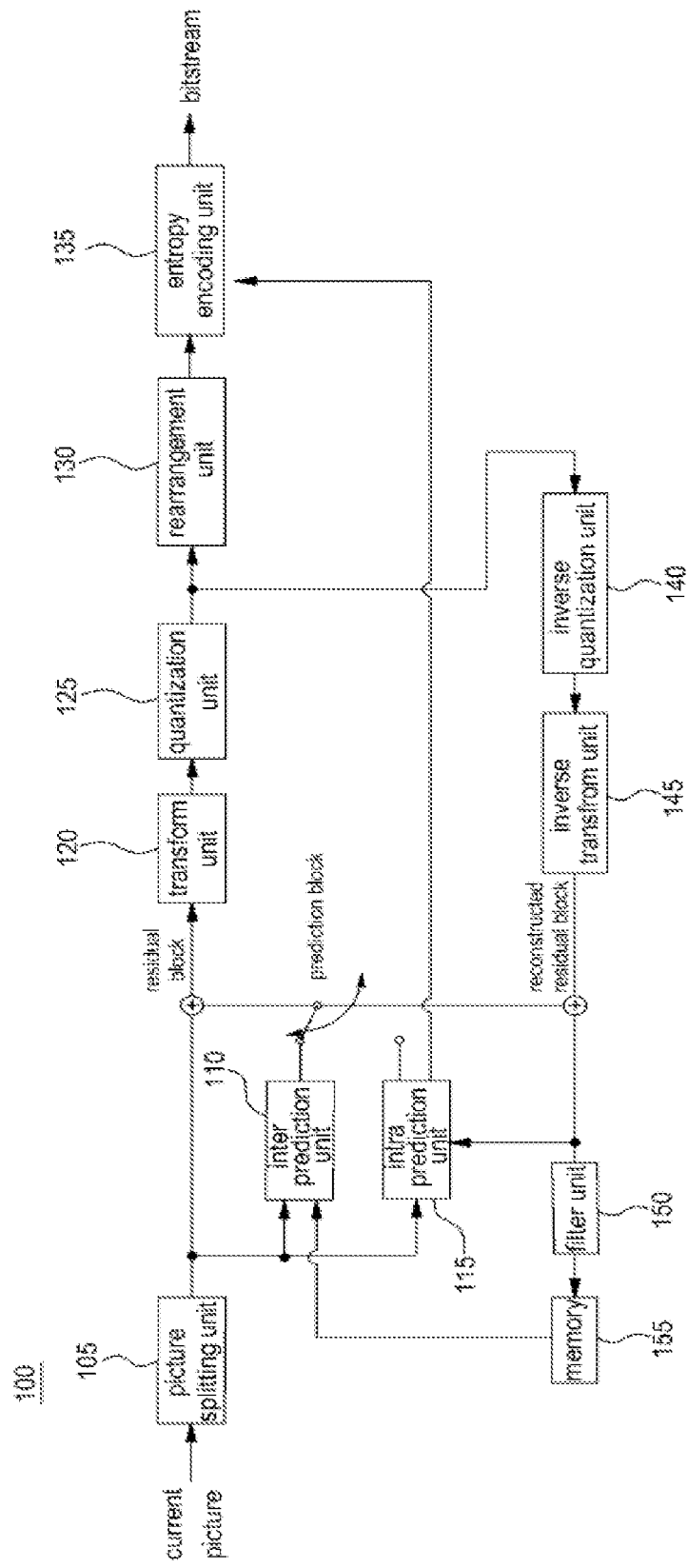
FIG. 1 is a block diagram schematically illustrating an encoder according to an embodiment of the present invention.

Hereinafter, the preferred embodiments of the present invention will be described in detail with reference to the accompanying drawings.

The embodiments of the present invention are provided to more fully explain the present invention for those having a common knowledge in the related art, and the following embodiments may be modified in many different forms, and the scope of the present invention is not limited to the following embodiments. Rather, these embodiments are provided so that this disclosure may be thoroughly and completely explained, and the concepts of the invention may be completely conveyed to those skilled in the art.

In addition, the thickness or size of each unit in the drawings are exaggerated for convenience and clarity of description, and the same reference numerals in the drawings refer to the same elements. As used herein, the term, "and/or" includes any and all combinations of one or more of the listed items.

The terminology used herein is used for the purpose of only describing particular embodiments and is not intended to be limiting the invention. As used herein, the singular forms such as "a", "an" and "the" may include the plural forms as well, unless the context clearly indicates otherwise. Also, as used herein, the term, "comprise" and/or "comprising" refers to the stated shapes, numbers, steps, operations, members, elements and/or presence of these groups, and it is not intended to exclude the presence or addition of one or more other shapes, numbers, operations, members, elements and/or presence of these groups.

Although the terms such as first, second, and etc. are used herein to describe various configuring element, member, component, region, and/or portion, it is obvious that these configuring element, member, component, region, and/or portion should not be limited by the terms. These terms are only used to distinguish one configuring element, member, component, region, and/or portion from another region or portion. Thus, the first configuring element, member, component, region, or portion which are described below, may refer to the second configuring element, member, component, region, or portion without departing from the concepts of the present invention. In addition, the term, "and/or" includes a combination of a plurality of related items or any item of a plurality of related items.

When a configuring element is referred to as being "coupled" or "connected" to another configuring element, it should be understood that it is not only directly "coupled or connected" to the other configuring element, but also includes a case that other configuring elements exist between any one of the above configuring element and the other configuring element. However, when a configuring element is referred to as being "directly coupled" or "directly connected" to another configuring element, it should be understood that there are no other configuring elements between the above configuring elements, and the above configuring element and the other configuring element are directly coupled or connected.

Hereinafter, the embodiments of the present invention will now be described with reference to the drawings, which schematically illustrate ideal embodiments of the present invention. In the drawings, for example, the size and shape of the members may be exaggerated for convenience and clarity of description, and in actual implementation, variations of the illustrated shape may be expected. Accordingly, the embodiments of the present invention should not be construed as limited to the specific shapes of the regions shown herein.

FIG. 1 is a block diagram schematically illustrating an encoder according to an embodiment of the present invention.

Referring to FIG. 1, the encoder 100 includes a picture splitting unit 105, an inter prediction unit 110, an intra prediction unit 115, a transform unit 120, a quantization unit 125, and a rearrangement unit 130, an entropy encoding unit 135, an inverse quantization unit 140, an inverse transform unit 145, a filter unit 150, and a memory 155.

Each of the configuring elements shown in FIG. 1 is independently illustrated to represent different characteristic functions in the encoder, and does not mean that each element is composed of separate hardware or one software component unit. In other words, each element is included in a manner that it is enumerated one by one as for convenience of description, and at least two of the configuring elements are combined into one configuring element, or one element may be split into a plurality of configuring elements to provide a function. The embodiments in which each of these elements are integrated or separated may be included in the scope of the present invention without departing from the essential aspects of the present invention.

The picture splitting unit 105 may split the input picture into slices or tiles, and the tiles may include a plurality of slices. The slice or the tile may be a collection of a plurality of coding tree blocks. Since the tiles may independently perform a coding process in the current picture, they may be considered as an important part for parallel processing of images. The tile or the slice currently has a limited structure, but as a need arises for identifying a picture and separately coding the pictures, it is necessary to split the tiles or the slices into various structures to meet the needs. Detailed embodiments thereof will be described later with reference to FIG. 3 to FIG. 21B.

Also, the picture splitting unit 105 may split the input picture into at least one processing unit. Herein, the processing unit is not a unit incompatible with a slice or a tile, and the slice or tile may be a higher concept including the processing units. The processing unit may be a prediction block (hereinafter referred to as a "PU"), a transform block (hereinafter referred to as a "TU"), or a coding block (hereinafter referred to as a "CU"). However, in the present specification, for convenience of description, the prediction block, a transform block, and an encoding block or a decoding block may be represented by a prediction unit, a transform unit, a coding unit or a decoding unit, respectively.

In one embodiment, the picture splitting unit 105 may split a picture into a combination of a plurality of coding blocks, prediction blocks, and transform blocks, and may encode the picture by selecting a combination of a coding block, a prediction block, and a transform block based on a predetermined criterion (eg, a cost function).

For example, one picture may be split into a plurality of coding blocks. In one embodiment, one picture may split the coding block by using a recursive tree structure such as a quad tree structure or a binary tree structure. Furthermore, a coding block split into other coding blocks by using a coding block (largest coding unit) of a maximum size as a root may be split with the number of the child nodes corresponding to the number of split coding blocks. Through this process, the coding blocks that are no longer split may be leaf nodes.

The prediction block may be split in the form of at least one square or non-square, and so on of the same size in one coding block, and any one of the prediction blocks split in one coding block may be split to have a different shape and size from another prediction block. In one embodiment, the coding block and the prediction block may be the same. That is, the prediction may be performed based on the split coding block without distinguishing the coding block and the prediction block.

The prediction unit may include an inter prediction unit 110 that performs inter prediction and an intra prediction unit 115 that performs intra prediction. In order to improve coding efficiency, the picture signal is not encoded as it is, but a picture is predicted by using a specific region inside a picture that has already been encoded and decoded, and a residual value between the original picture and the picture to be predicted is encoded. In addition, a prediction mode information and motion vector information used for prediction may be encoded by the entropy encoding unit 135 along with the residual value and then, transmitted to the decoder. In the case of using a specific encoding mode, the prediction blocks 110 and 115 may not generate prediction blocks. Instead, it is also possible to encode the original block as it is and to transmit it to the decoder.

In an embodiment, the prediction units 110 and 115 may determine whether to perform inter-prediction or intra-prediction for a prediction block, and may determine the specific information according to each of the prediction methods such as the inter prediction mode, the motion vector, and the reference picture. In this case, the processing unit in which the prediction is performed, the prediction method, and the detailed processing unit may be different. For example, although the prediction mode and the prediction method are determined according to a prediction block, the performance of the prediction may be performed according to a transform block.

The prediction units 110 and 115 may perform prediction on the processing unit of the picture split by the picture splitting unit 105 to generate a prediction block composed of the predicted samples. The picture processing unit in the prediction units 110 and 115 may be a coding block unit, a transform block unit, or a prediction block unit.

The inter prediction unit 110 may predict a prediction block based on information of at least one or more pictures of a previous picture or a subsequent picture of the current picture, and in some cases, predict the prediction block based on information of a partial region in which coding in the current picture is completely finished. The inter prediction unit 110 may include a reference picture interpolator, a motion prediction unit, and a motion compensation unit.

Unlike the inter prediction, the intra prediction unit 115 may generate a prediction block based on reference pixel information around the current block, which is pixel information in the current picture. If the neighboring blocks of the prediction block are blocks that perform inter prediction, that is, when the reference pixel is a pixel that performs inter prediction, the reference pixels included in the block on which the inter prediction is performed may be replaced with the reference pixel information of a block that has performed the intra prediction in the periphery.

A residual value (residual block or residual signal) between the prediction block generated by the intra prediction unit 115 and the original block may be input to the transform unit 120. In addition, prediction mode information and interpolation filter information used for prediction may be encoded by the entropy encoding unit 135 together with the residual value and transmitted to a decoder.

The transform unit 120 may transforms the residual block including residual value information of the original block and the prediction unit generated by the prediction units 110 and 115 as a transform unit, by using a transformation method such as a discrete cosine transform (DCT), and a discrete sine transform (DST), and Karhunen Loeve Transform (KLT). The applied method among the various transformation methods such as DCT, DST, or KLT in order to transform the residual block may be determined based on intra prediction mode information of the prediction unit used to generate the residual block.

The quantization unit 125 may generate quantization coefficients by quantizing the residual values transformed by the transform unit 120. In one embodiment, the transformed residual values may be values transformed into a frequency domain. The quantization coefficient may be changed according to the transform unit or the importance of the picture, and the value calculated by the quantization unit 125 may be provided to the inverse quantization unit 140 and the reordering unit 130.

The reordering unit 130 may reorder the quantization coefficients provided from the quantization unit 125. The reordering unit 130 may improve the coding efficiency of the entropy encoding unit 135 by rearranging the quantization coefficients. The reordering unit 130 may reorder the quantization coefficients in the form of a two-dimensional block into a one-dimensional vector form through a coefficient scanning method. The coefficient scanning method may determine an applied scanning method according to the size of the transform unit and the intra prediction mode. The coefficient scanning method may include a zig-zag scan, a vertical scan that scans the coefficients of two-dimensional block form in a column direction, and a horizontal scan that scans the coefficients of two-dimensional block form in a row direction. In one embodiment, the reordering unit 130 may increase the entropy coding efficiency in the entropy encoder 135 by changing the order of coefficient scanning based on probabilistic statistics of coefficients transmitted from the quantization unit.

The entropy encoding unit 135 may perform an entropy encoding process on the quantized coefficients rearranged by the reordering unit 130. Entropy coding process may use, for example, various coding methods such as Exponential Golomb, Context-Adaptive Variable Length Coding (CAVLC), and Content-Adaptive Binary Arithmetic Coding (CABAC).

The entropy encoding unit 135 may encode various information such as quantization coefficient information, block type information, prediction mode information, splitting unit information, prediction unit information, transmission unit information, motion vector information, reference picture information, interpolation information of a block, and filtering information of the coding unit received from the reordering unit 130 and the prediction units 110 and 115. In addition, in an embodiment, the entropy encoding unit 135 may apply a constant change to a parameter set or syntax to be transmitted when necessary.

The inverse quantization unit 140 inversely quantizes the quantized values in the quantization unit 125, and the inverse transform unit 145 inversely transforms the inverse quantized values in the inverse quantization unit 140. The residual values generated by the inverse quantization unit 140 and the inverse transform unit 145 may be combined with the prediction blocks predicted by the predictors 110 and 115 to generate a reconstructed block. The picture composed of the prediction blocks may be a motion compensated picture, that is, an MC picture. The picture composed of the generated reconstructed blocks may be a reconstructed picture.

The reconstructed picture may be input to the filter unit 150. The filter unit 150 may include a deblocking filter unit, an offset correction unit (Sample Adaptive Offset, SM)), and an adaptive loop filter (ALF) unit. In summary, in the deblocking filter unit, a deblocking filter may be applied to the reconstructed picture to reduce or remove blocking artifacts, and then input to an offset correction unit to correct an offset. The picture output from the offset correction unit may be input to the adaptive loop filter unit and pass through an ALF filter, and the picture passing through the filter may be transmitted to the memory 155.

The offset correction unit may correct the offset with respect to the original picture on a pixel-by-pixel basis for the residual block to which the deblocking filter is applied. Adaptive Loop Filter (ALF) unit is a technique that makes the reconstructed picture look similar to the original picture based on the value obtained by comparing the filtered reconstructed picture and the original picture, and it may be used selectively by block or by picture.

The memory 155 may store the reconstructed block or the picture calculated by the filter unit 150. The reconstructed block or the picture stored in the memory 155 may be provided to the inter prediction unit 110 that performs inter prediction, or the intra prediction. The pixel values of the reconstructed blocks used in the intra prediction unit 115 may be data to which the deblocking filter unit, the offset correction unit, and the adaptive loop filter unit are not applied.

Figure 2:
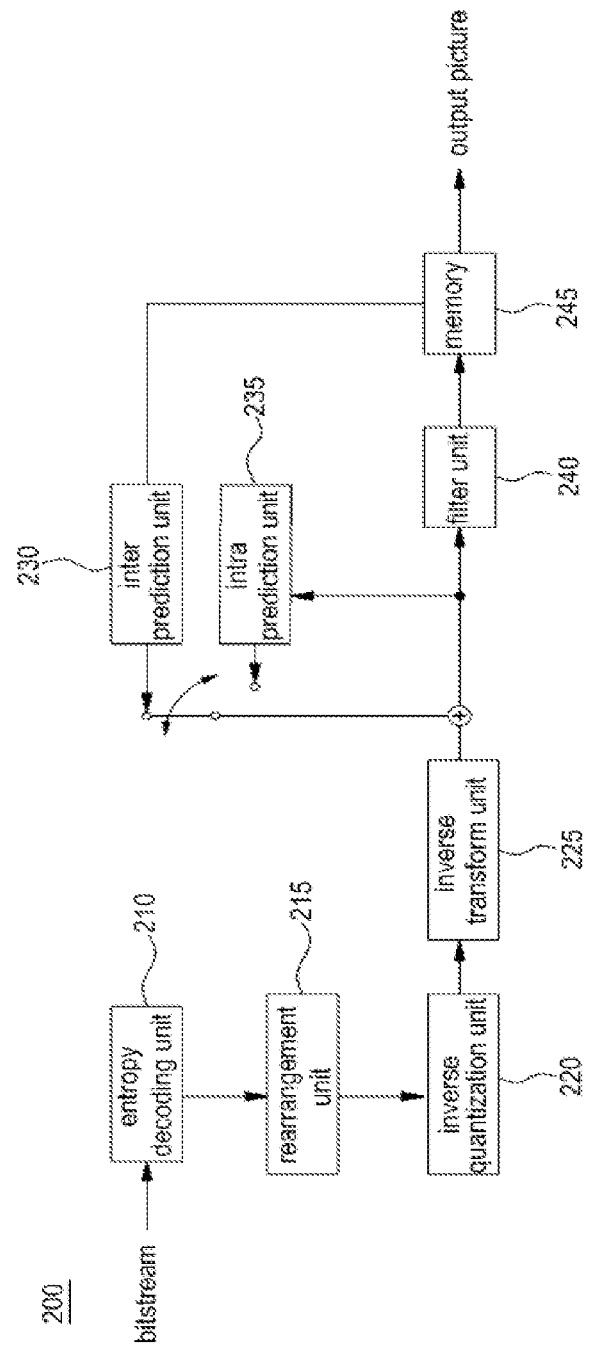
FIG. 2 is a block diagram schematically illustrating a video decoding apparatus according to an embodiment of the present invention.

FIG. 2 is a block diagram schematically illustrating a decoding apparatus according to an embodiment of the present invention. Referring to FIG. 2, the picture decoding apparatus 200 may include an entropy decoding unit 210, a reordering unit 215, an inverse quantization unit 220, an inverse transform unit 225, an inter prediction unit 230, and an intra prediction unit 235, a filter unit 240 and a memory 245.

When a picture bitstream is input from the encoding apparatus, the input bitstream may be decoded according to a reverse step of a process by which picture information is processed in the encoding apparatus. For example, when variable length coding ('VLC') such as CAVLC is used to perform entropy encoding in the encoding apparatus, the entropy decoder 210 may also perform entropy decoding by implementing the same VLC table as the VLC table used in the encoding apparatus. In addition, when CABAC is used to perform an entropy encoding step in the encoding apparatus, the entropy decoding unit 210 may perform an entropy decoding step by using CABAC.

The entropy decoding unit 210 provides information for generating a prediction block among the decoded information to the inter prediction unit 230 and the intra prediction unit 235, and a residual value for which the entropy decoding is performed by the entropy decoding unit may be input to the reordering unit 215

The reordering unit 215 may reorder the entropy-decoded bitstream by the entropy decoding unit 210 based on a method reordered in the encoder. The reordering unit 215 may receive the information related to the coefficient scanning performed by the encoding apparatus and perform a reordering step through a reversely scanning method based on the scanning order performed by the encoding apparatus.

The inverse quantization unit 220 may perform an inverse quantization step based on the quantization parameter provided by the encoding apparatus and the coefficient values of the reordered block. The inverse transform unit 225 may perform inverse DCT, inverse DST, or inverse KLT on the DCT, DST, or KLT performed by the transform unit of the encoding apparatus with respect to the quantization result performed by the picture encoding apparatus. The inverse transform may be performed based on a transmission unit determined by the encoding apparatus or a splitting unit of a picture. The transform unit of the encoding apparatus may selectively perform DCT, DST, or KLT according to information such as a prediction method, a size of the current block, and a prediction direction, and since an inverse transform method is be determined based on the transform information performed by the transform unit of the encoding apparatus, the inverse transform unit 225 of the decoding apparatus may perform an inverse transform.

The prediction units 230 and 235 may generate a prediction block based on the information related to the prediction block generation provided by the entropy decoding unit 210, and the previously decoded block and/or picture information provided by the memory 245. The reconstruction block may be generated by using the prediction block generated by the predictors 230 and 235 and the residual block provided by the inverse transform unit 225. The method of specific prediction performed by the predictors 230 and 235 may be the same as the method of prediction performed by the predictors 110 and 115 of an encoder.

The prediction units 230 and 235 may include a prediction unit determination unit (not shown), an inter prediction unit 230, and an intra prediction unit 235. The prediction unit determination unit receives various information such as prediction unit information decoded by the entropy decoder 210, prediction mode information of the intra prediction method, and motion prediction related information of the inter prediction method, identifies the prediction block in the current coding block, and may determine whether the prediction block performs inter prediction or intra picture prediction.

The inter prediction unit 230 may perform an inter prediction on the current prediction block based on information included in at least any one of a previous picture or a subsequent picture of the current picture including the current prediction block by using information necessary for inter prediction of the current prediction block provided by the encoder. Motion information including a motion vector and a reference picture index required for inter prediction of the current block may confirm a skip flag, a merge flag, and the like received from the encoder, and may be derived in response to the flags.

The intra prediction unit 235 may generate a prediction block based on pixel information in the current picture. When a prediction unit is an unit that performs the intra prediction, the intra prediction unit 235 may perform an intra prediction based on the intra prediction mode information of the prediction unit provided by the encoder. When the neighboring blocks of the prediction unit are blocks that perform inter prediction, that is, when the reference pixel is a pixel that performs inter prediction, the reference pixel included in the block on which the inter prediction is performed may be replaced with the reference pixel information of the block on which the intra prediction in the peripheral side is performed.

Also, the intra prediction unit 235 may use the most probable intra prediction mode (MPM) obtained from neighboring blocks to encode the intra prediction mode. In one embodiment, the most probable intra picture prediction mode may use the intra picture prediction mode of the spatial neighboring block of the current block.

The intra prediction unit 235 may include an adaptive intra smoothing (AIS) filter unit, a reference pixel interpolator unit, and a DC filter unit. The AIS filter unit performs filtering on the reference pixel of the current block and determines whether to apply the filter according to the prediction mode of the current prediction unit. AIS filtering may be performed on the reference pixel of the current block by using the prediction mode and the AIS filter information of the prediction unit provided by the encoder. When the prediction mode of the current block is a mode in which AIS filtering is not performed, the AIS filter unit may not be applied to the current block.

The reference pixel interpolator may generate a reference pixel of a pixel unit having an integer value or less by interpolating the reference pixel when the prediction mode of the prediction unit is an unit that performs intra prediction based on the sample value obtained by interpolating a reference pixel. When the prediction mode of the current prediction unit is a prediction mode that generates a prediction block without interpolating the reference pixel, the reference pixel may not be interpolated. The DC filter unit may generate a prediction block through a filtering step when the prediction mode of the current block is the DC mode.

The reconstructed block and/or picture may be provided to the filter unit 240. The filter unit 240 may include a deblocking filter unit, an offset correction unit (S ample Adaptive Offset), and/or an adaptive loop filter unit in the reconstructed block and/or picture. The deblocking filter may receive information indicating whether a deblocking filter is applied to a corresponding block or picture from the encoder and information indicating whether a strong or weak filter is applied when the deblocking filter is applied. The deblocking filter unit may receive the deblocking filter related information provided by the encoder, and perform a deblocking filtering on the corresponding block in the decoder.

The offset correction unit may perform an offset correction on the reconstructed picture based on the type of offset correction and offset value information applied to the picture during encoding. The adaptive loop filter unit may be applied as a coding unit on the basis of information such as whether to apply the adaptive loop filter provided from the encoder and the coefficient information of the adaptive loop filter. The information related to the adaptive loop filter may be provided in a specific parameter set.

The memory 245 may store the reconstructed picture or block to be used as a reference picture or reference block later, and may provide the reconstructed picture to the output unit.

Although omitted for convenience of description in the present specification, the bitstream input to the decoding apparatus may be input to the entropy decoding unit through a parsing step. In addition, the entropy decoding unit may perform a parsing process.

In the present specification, coding may be interpreted as encoding or decoding in some cases, and it may be understood that information includes all of values, parameters, coefficients, elements, flags, and the like. 'A screen' or 'a picture' generally means a unit representing one picture in a specific time zone, and 'a slice', 'a frame', and the like are units that constitute a part of a picture in actual coding of a video signal, and may be used interchangeably with a picture as necessary.

'Pixel', 'pixel' or 'pel' represents the minimum unit constituting a picture. In addition, as a term indicating a value of a specific pixel, 'sample' may be used. The sample may be split into a luminance (Luma) and a chrominance (Chroma) component, but may be generally used as a term including both of them. In the above paragraphs, the chrominance (a color difference component) represents a difference between predetermined colors and is generally composed of Cb and Cr.

'Unit' refers to a basic unit of picture processing or a specific position of a picture, such as the above-described coding unit, a prediction unit, and a transformation unit, and in some cases, the terms such as 'block' or 'region' may be used interchangeably. Also, a block may be used as a term indicating a set of samples or transform coefficients composed of M columns and N rows.

Figure 3A:
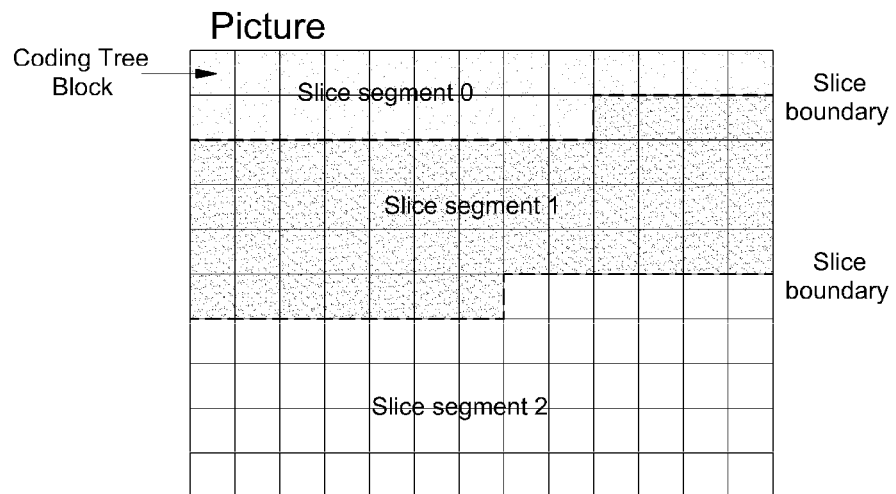
FIG. 3A and FIG. 3B are diagrams illustrating a slice and tile splitting method of a current picture according to a general method.
Figure 3B:
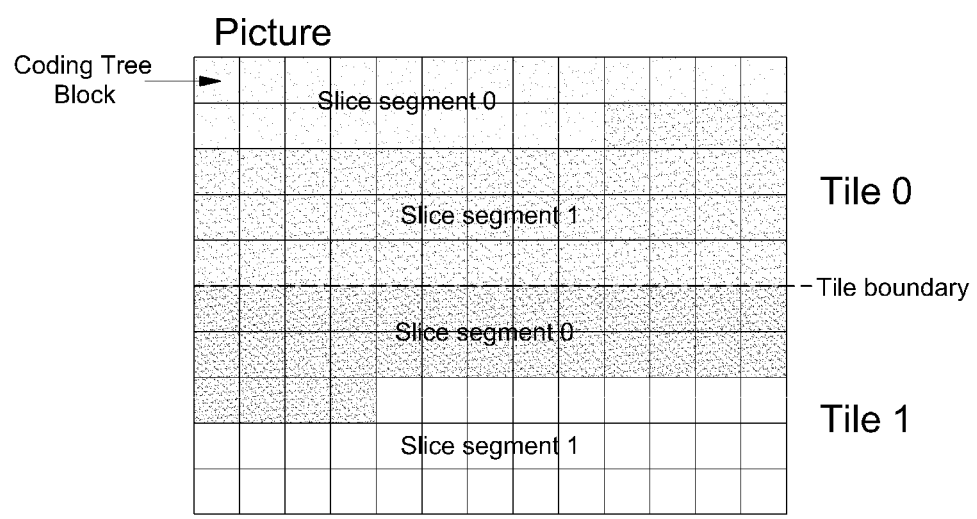

FIG. 3A and FIG. 3B are diagrams illustrating a slice and tile splitting method of a current picture according to a general method.

FIG. 3A shows a structure in which one picture is split into three slices by a conventional method. Referring to FIG. 3A, one picture may be split into at least one or more slices (Slice segment 0, 1, 2). The slices may be composed of one or a plurality of coding tree blocks, and a slice boundary of the slice may be a stairway direction extending in a horizontal direction or a horizontal direction. In one embodiment, the slice may be a set of coding tree blocks organized according to raster scan order.

Referring to FIG. 3B, one picture may be split into at least one or more tiles. The tile may also consist of at least one or more slices. For example, a picture may be split into two tiles, such as tile 0 (Tile 0) and tile 1 (Tile 2), and tile 0 (Tile 0) may be configured by two slices (Slice segment 0 and Slice segment 1). Tile 1 (Tile 1) may also be configured by two slices (Slice segment 0, Slice segment 1).

Although the present invention discloses an example in which a picture consists of two tiles and each tile consists of two slices, the number of the tiles and slices which may be split in the present invention is not limited thereto. Also, although a tile structure obtained by dividing a current picture in a horizontal direction is disclosed, the current picture may have a tile structure split in a vertical direction.

Figure 5A:
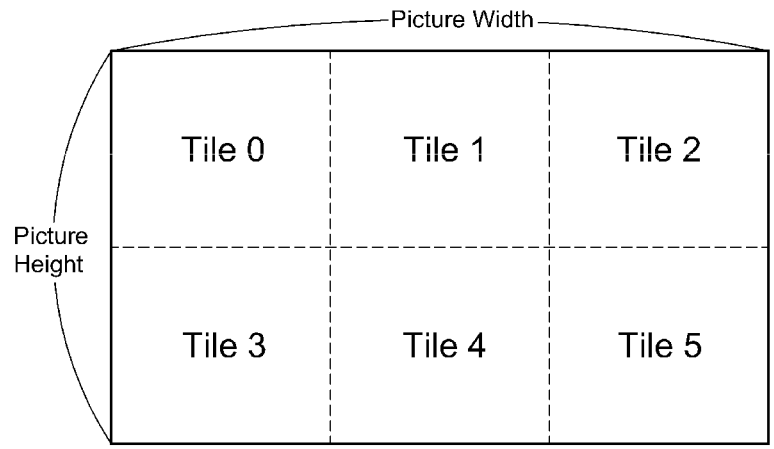
FIG. 5A to FIG. 6 illustrate a tile splitting structure of a current picture that may be configured according to a general method.
Figure 5B:
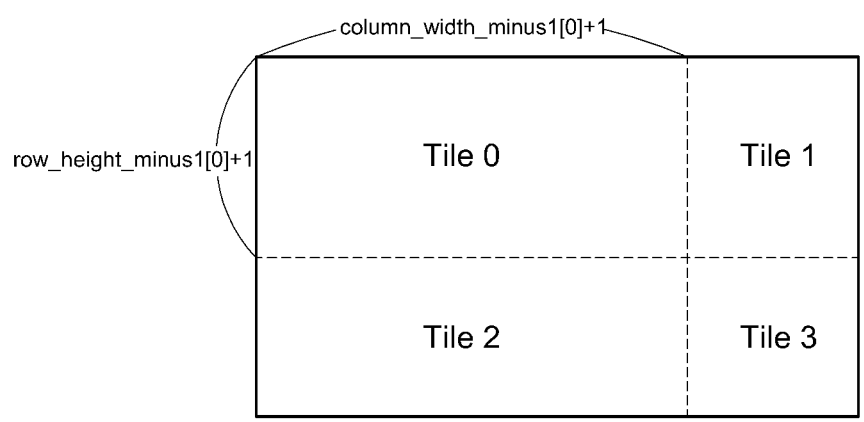

FIG. 4 is a syntax for configuring a tile of a current picture according to a general method. Various pieces of information for dividing a picture into at least one or more tiles may be transmitted by using a picture parameter set. FIG. 5A and FIG. 5B illustrate a tile splitting structure of a current picture that may be configured according to a general method using the syntax of FIG. 4.

Referring to FIG. 4, when the tile usage flag (tiles_enabled_flag) indicating whether the current picture uses a tile structure is 1, it means that the current picture is split into at least two or more tiles. On the other hand, when the tile use flag is 0, this means that the current picture is represented by one tile. Thereafter, the column direction splitting number information (num_tile_column_minus1) indicating the number of dividing tiles in the column direction of the current picture (the number of tiles split in the column direction-1), and a row direction splitting number information (num_tile_rows_minus1) indicating the number of dividing tiles in the row direction (the number of tiles split in the row direction-1) may be received. For example, when the column direction splitting number information (num_tile_column_minus1) is 2 and the row direction splitting number information (num_tile_rows_minus1) is 1, as shown in FIG. 5A, the current picture splits the current picture twice in the column direction and it may have a tile structure (Tile 0 to Tile 5) to be split once in the row direction.

Referring to FIG. 4 again, after receiving the column direction splitting number information and the row direction splitting number information, a tile equalization split flag (uniform_spacing_flag) indicating whether a current picture is composed of tiles of equal size may be received. If the tile equalization flag is 1, the current picture may form a tile by equally dividing the coding tree blocks in columns and rows based on the column direction splitting number information and the row direction splitting number information.

In an embodiment, when the tile equalization flag is 0, a column splitting size information (column_width_minus1[i]) and a row splitting size information (row_height_minus1[i]) indicating the size of the tile split in the column and row directions may be received additionally. Referring to FIG. 5B, when the tile equalization flag is 0 and the column direction splitting number information and the row direction splitting number information are both 1 (one splitting each), the current picture may be split into four tiles (Tile 0 to Tile 3). In addition, the size of the tile to be split may be determined using the column splitting size information and the row splitting size information.

Figure 6:
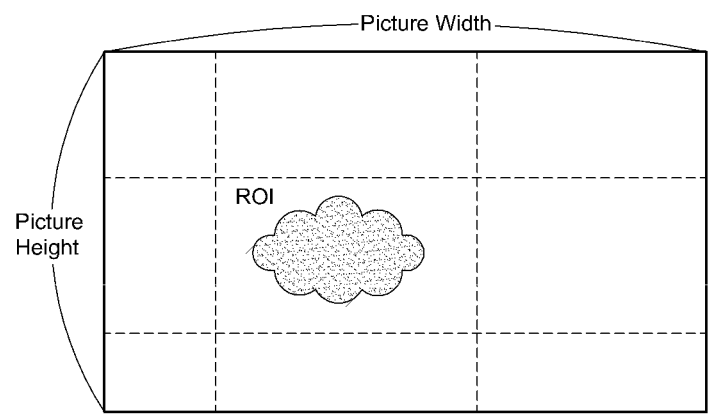

Such a tile splitting method may always be split using a splitting length equal to a height length or a width length of a picture in column splitting or row splitting for dividing a picture in a column or row direction. However, in connection with such a splitting method, when a tile is split in consideration of ROI as shown in FIG. 6, the coding efficiency is inevitably deteriorated because coding is performed by dividing into tiles even for a peripheral region that does not need to be split into tiles and does not need to perform coding independently.

As the utilization of virtual reality (VR) images as well as high-definition video is recently increased, a demand for an independent coding with high quality and low quality in one picture such as a high quality coding for a target region and a low quality coding for a surrounding region is increasing incessantly. Therefore, the present invention is not limited to the conventional splitting method, but a method for dividing into tiles having various structures will be described.

Figure 7:
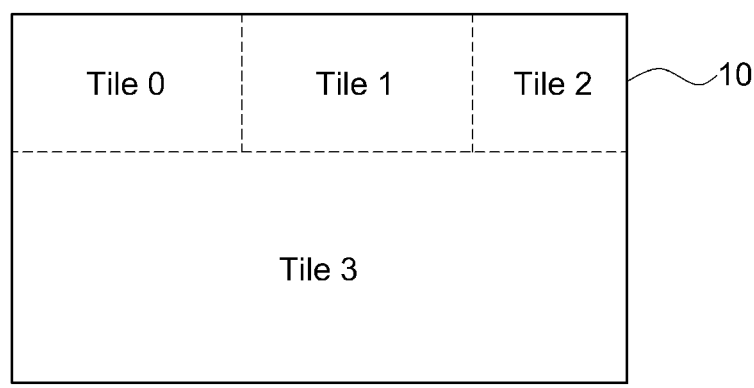
FIG. 7 is a flowchart illustrating a tile structure of a current picture.

FIG. 7 is a flowchart illustrating a tile structure of a current picture and a method of configuring the tile structure according to an embodiment of the present invention.

Referring to FIG. 7, the current picture 10 may be split into at least two or more tiles (Tile 0 to 3) by column splitting and row splitting. In the present invention, the column splitting refers to split the current picture into vertical splitting lines in order to split the current picture into the tiles of a vertical direction. In addition, the row splitting refers to split the current picture into horizontal splitting lines in order to split the current picture into tiles of the horizontal direction.

Figure 9:
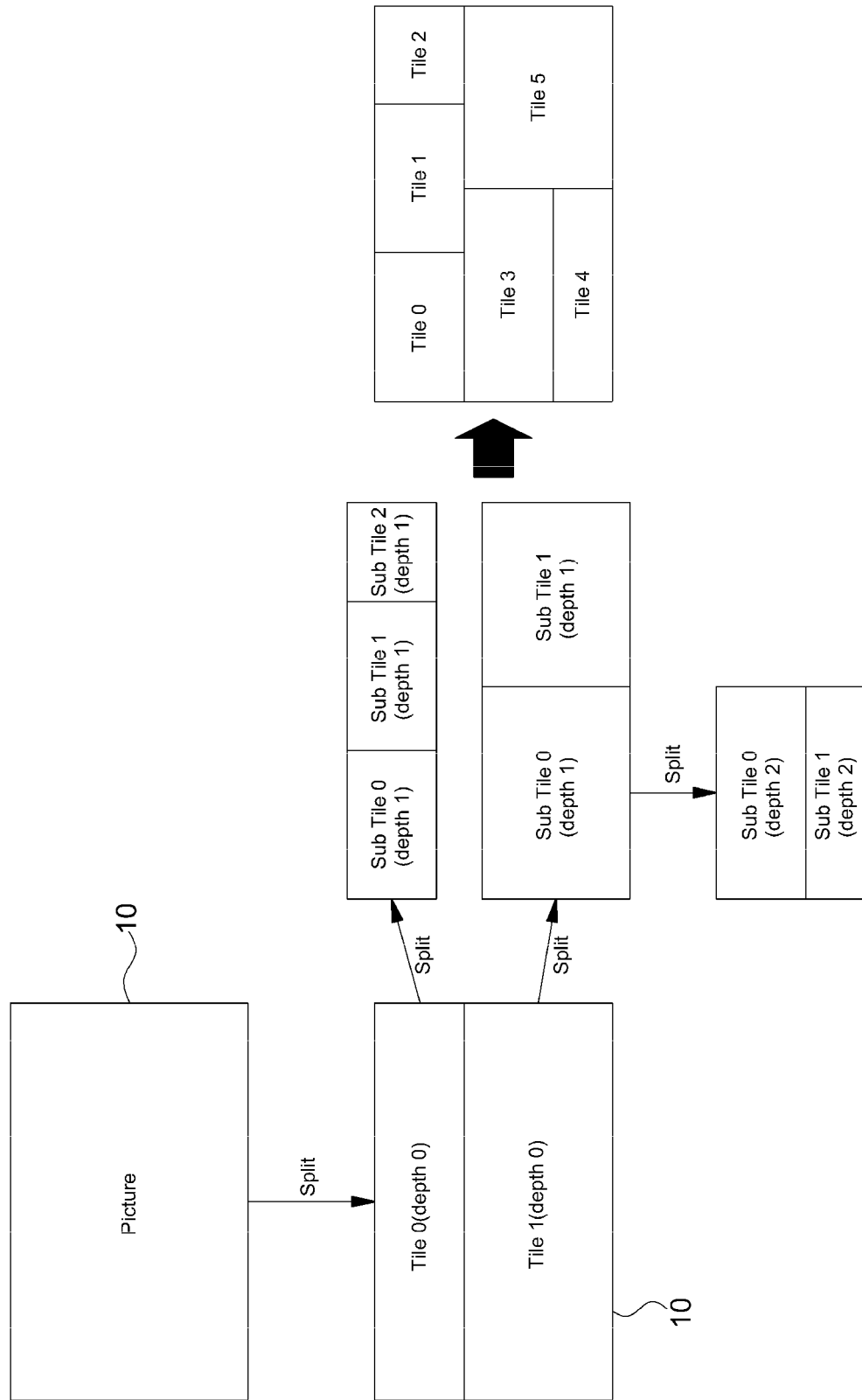
FIG. 9 is a schematic diagram illustrating a method for configuring a tile structure of a current picture.

In connection with the method for configuring a tile structure according to an embodiment of the present invention, at least one or more of the column splitting and the row splitting may be split using a splitting length shorter than the height length or the width length of the current picture. For example, as illustrated in FIG. 7, the current picture 10 may be split into at least two or more tiles (Tile 0 to Tile 3) by using the column splitting having a length shorter than the height length of the current picture and the row splitting having a length equal to the width length of the current picture. As described above, the method for configuring a tile structure of the present invention may form various tile structures by configuring a tile based on the column splitting or the row splitting having a length shorter than the vertical or width length of the current picture. Therefore, coding efficiency may be improved by dividing and coding a target region corresponding to a region substantially required by the various tile structures.

re is a flowchart illustrating a method of configuring a tile structure of a current picture, according to an embodiment of the present invention, FIG. 9 is a schematic diagram illustrating a method for configuring a tile structure of a current picture, and FIG. 10 is a syntax for configuring a tile structure.

Figure 8:
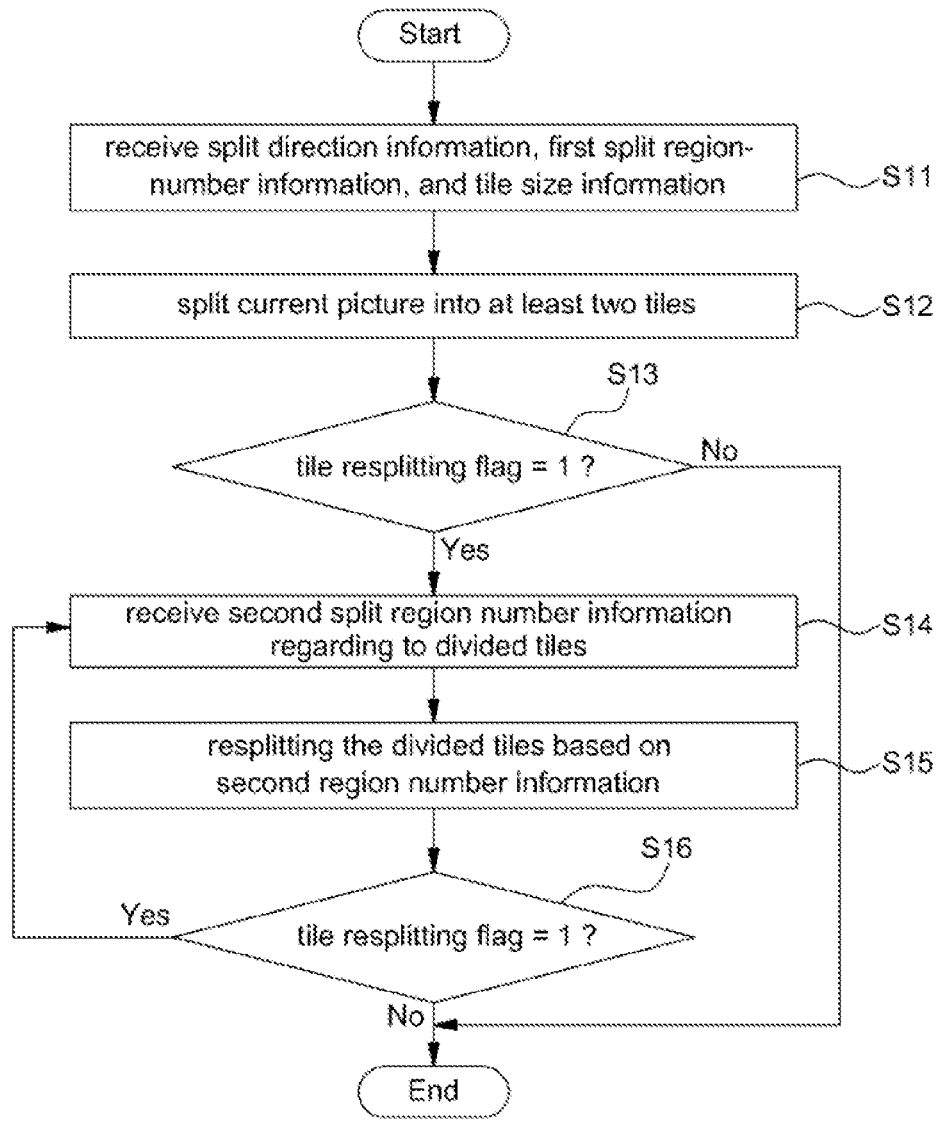
FIG. 8 is a flowchart illustrating a method of configuring a tile structure of a current picture according to an embodiment of the present invention.

Referring to FIG. 8 to FIG. 10, first of all, the current picture may be split into any one of a column direction or a row direction. First, a split direction information indicating in which direction the current picture is split, a first split region number information indicating the number of tiles into which the current picture is split based on the split direction information, and a tile size information indicating the size of the split tile may be received (S11). For example, the current picture 10 may be split into tile 0 and tile 1 having a depth 0 by using first_tile_split_direction (21) which is split direction information included in the picture parameter set (PPS). In this case, the splitting may be split into two or more tiles having a depth of 0 by using num_tile_in_dir_minus1 (22), which is received first split region number information, and tile_size_minus1[i] (23), which is tile size information (S12).

The tile size information indicates the size of the split tile. For example, the tile size information may be represented by the number of encoding unit or decoding unit including a coating tree block. In addition, i represents an i-th split region.

In an embodiment, a tile resplitting flag (tile_split_flag [i] 24) indicating whether there is a resplitting with respect to the split tile may be received (S13). If the tile resplitting flag 24 of the split tile of depth 0 is 0 (No in S13), the tile is not further split. On the other hand, when the tile resplitting flag 24 of the split tile having the depth 0 is 1 (Yes in S13), the tile may be subdivided into at least two or more tiles. When the tile resplitting flag 24 is 1, a second split region number information indicating the number of tiles to be subdivided may be further received (S14). In one embodiment, when the tile resplitting flag 24 is 1, a tile resplitting process or module 25 (25, tile_adpative_spit (tile_split_direction)) may be executed. The tile resplitting process may use higher-level split direction information (tile_split_direction and parent_tile_split_direction), and the tile resplitting process may generate a second split region number information (num_tile_in_dir_minus1; 26), the tile size information (tile_size_minus1; 27), and a tile resplit flag (tile_split_flag; 28).

When the tile resplitting flag 24 is 1, the corresponding tile may be subdivided based on the received second split region number information 26 and size information 27 (S14 and S15). In this case, it may be split in a direction perpendicular to the split direction indicated by the split direction information (parent_tile_split_direction) which is the split direction of the previous level. Subsequently, when the tile resplitting flag 28 is checked (S16) and the tile resplitting flag 28 is 1 (Yes in S16), the third split region number information indicating the number of the split tiles may be subdivided in a direction perpendicular to the previous split direction (S15). When the tile resplitting flag 28 is 0 (No in S16), the tile resplitting is finished and the tile configuration of the current picture may be completed.

According to an embodiment of the present invention, only the split direction information (first_tile_split_direction) 21 indicating the first split direction for dividing the current picture may be received through syntax. Other information may be obtained by using information previously transmitted from the decoding apparatus. In addition to the split direction information, only some of the information described with reference to FIG. 10 may be received through the syntax, and some information may be obtained from the decoding apparatus by using previously transmitted information.

Figure 11:
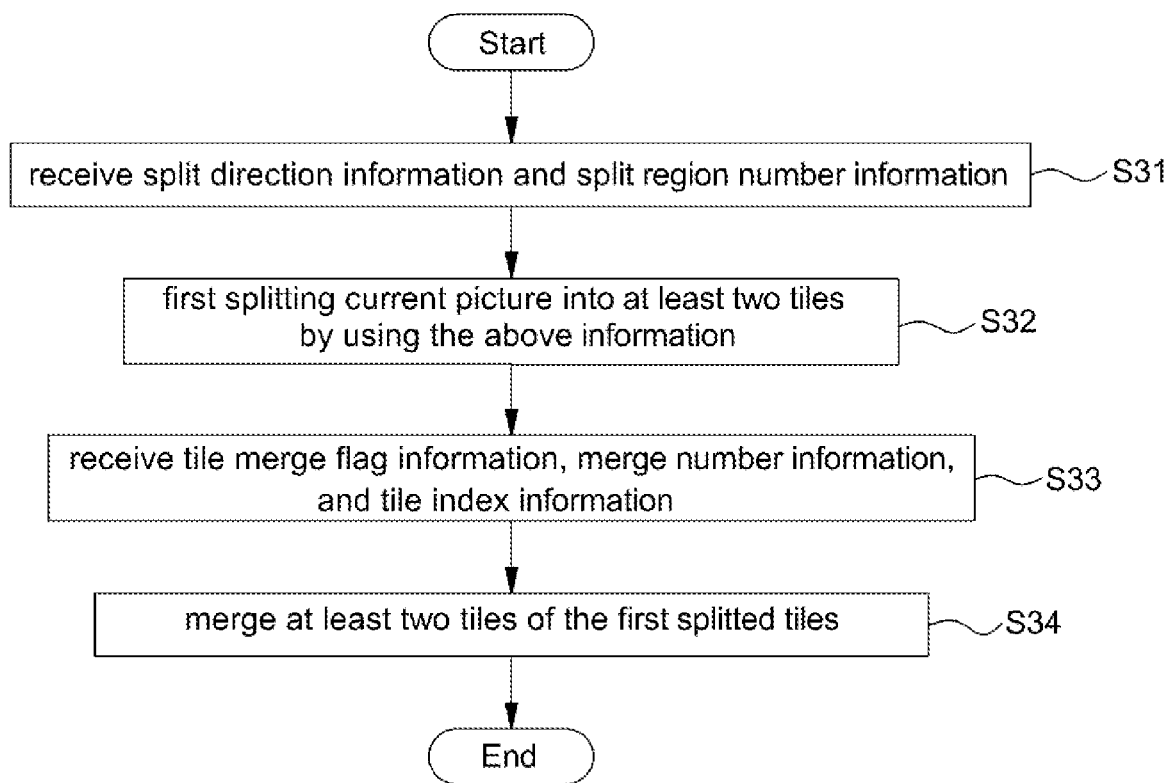
FIG. 11 is a flowchart illustrating a method for configuring a tile structure of a current picture according to another embodiment of the present invention.

In addition, another embodiment for configuring a tile structure of various shapes will be described. FIG. 11 is a flowchart illustrating a method for configuring a tile structure of a current picture according to another embodiment of the present invention, FIG. 12 illustrates a tile structure constructed according to the flowchart of FIG. 11, and FIG. 13 is a syntax for configuring the tile structure.

Figure 12:
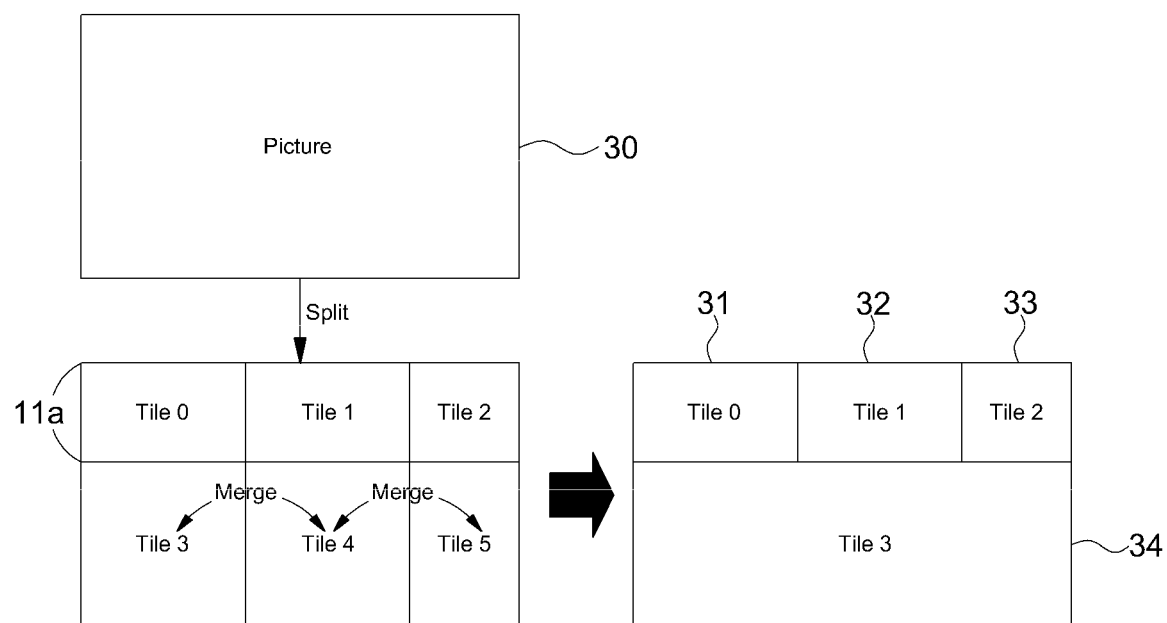
FIG. 12 illustrates a tile structure constructed according to the flowchart of FIG. 11.

Referring to FIG. 11 to FIG. 13, first of all, in order to split a current picture into at least two or more tiles, a split direction information indicating a split direction and a split region number information for dividing a current picture may be received (S31). Above all, the current picture may be split into at least two or more tiles by using the split direction information and the split region number information (S32). For example, if num_tile_columns_minus1 is 2 and num_tile_rows_minus1 is 1, the current picture 30 may be firstly split into tiles 0 to 5 (TILE 0 to TILE 5).

Subsequently, for each tile region, the tile_merge_flag [i] (41) which is a tile merge flag information indicating whether to merge with another tile, the num_merge_tile_minus1 (42) which is a merge number information indicating how many tiles are merged, and the target_tile_ID [i] (43) which is a tile index information indicating a tile to be merged may be received (S33). When the tile merge flag information is 0, the tile may not be merged with another tile. Meanwhile, when the tile merge flag information is 1, the tile may be merged with another tile. Here, i represents a tile index of the corresponding tile among the first split tiles.

When the tile mere flag information is 1, at least two or more tiles of the firstly split tiles may be merged by using the merge number information 42 and the index information 43 of the tiles to be merged (S34). For example, if tile_merge_flag[3]=1 (meaning that Tile 3 is merged) and num_merge_tile_minus1=1, the total number of other tiles merged with Tile 3 is 2(num_merge_tile_minus1+1). Next, in connection with information on target_tile_ID which is information to be decoded, if target_tile_ID [0]=4 and target_tile_ID [1]=5, as shown in FIG. 12, The firstly split TILE 3 to TILE 5 may be merged to form the final TILE 3. According to this method, unlike the conventional tile configuration method, the current picture 30 may be composed of at least two or more tiles TILE 0 to TILE 3 (31 to 34) having various shapes. However, the syntax illustrated in FIG. 13 is only an example for constructing the present invention, and the design of the syntax is not limited thereto.

Figure 14:
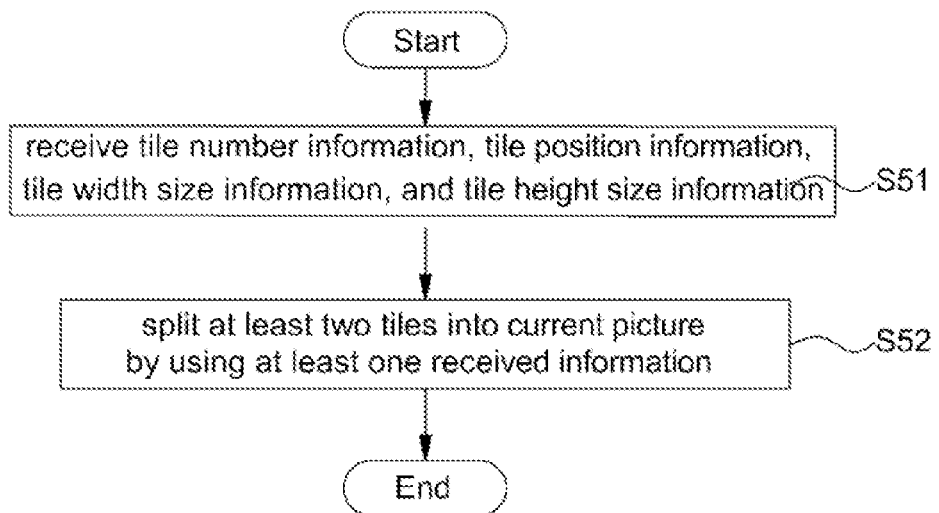
FIG. 14 is a flowchart illustrating a method for configuring a tile structure of a current picture according to another embodiment of the present invention.

Still other embodiments may exist for constructing tile structures of various shapes. FIG. 14 is a flowchart illustrating a method for configuring a tile structure of a current picture according to another embodiment of the present invention, FIG. 15 illustrates a tile structure constructed according to the flowchart of FIG. 14, and FIG. 16 is a syntax for configuring the tile structure.

Figure 15:
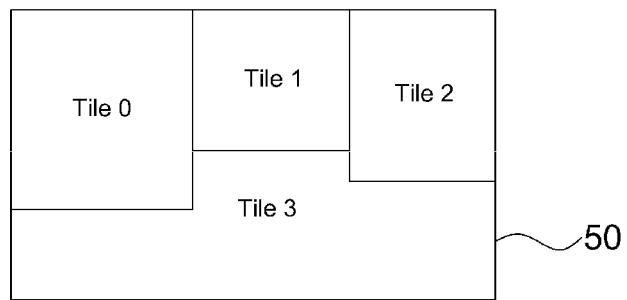
FIG. 15 illustrates a tile structure constructed according to the flowchart of FIG. 14.

Referring to FIG. 14 and FIG. 15, in order to split the current picture 50 into at least two or more tiles, a tile number information, a tile position information, a tile width size information, and a tile height size information may be received (S51). The tile number information indicates the number of tiles into which the current picture is split, and the tile position information indicates the position of the concerned tile. The tile number information and the tile position information may be represented by an index of a coding unit including a coding tree block. In one embodiment, the tile number information and the tile position information may be represented by a coordinate information identifying a width and a length of the current picture as a coding unit including a coding tree block. As described above, the present invention is not limited to the method for calculating or expressing information indicating the position of the concerned tile region for the tile number information and the tile position information.

The width size information of the tile and the height size information of the tile indicate the horizontal and height sizes of the corresponding tile, and may also be expressed by an index of a coding unit including a coding tree block. However, the method for expressing the width size information of the tile and the height size information of the tile is not limited thereto. The current picture 50 may be split into two or more tiles (TILE 0 to TILE 3) by using at least one or more of the received information, such as the tile number information, the tile position information, the width size information of the tile, and the height size information of the tile (S52).

Referring to FIG. 16, first of all, num_tile_in_picture_minus1 (51), which is tile number information included in a picture parameter set, may be received. In addition, tile_start_ctb_address_in_picture[i] (52) which is tile position information on a corresponding tile may be received. In addition, column_width_minus1[i] (53) and row_height_minus1 [i] (54) which are tile width size information and tile height size information may be received. Herein, if the number of tiles constituting the current picture 50 is N, i may have a value from 0 to N-2. That is, information of the 0 th tile to the N-2 th tile may be expressed as the information, and the last tile, the N-1 th tile, may be an region not including the 0 th to the N-2th tile region.

According to various embodiments of the present invention, the present invention may configure a current picture with at least two or more tile structures split into various shapes. However, the syntax illustrated in FIGS. 10, 13, and 16 is only examples for constructing the present invention, and the design of the syntax is not limited thereto.

The current picture may be composed of at least two tiles, and the tiles may be a unit capable of independent coding. In addition, the tile may be composed of at least two slices. Conventional slices may have a slice boundary in a horizontal direction or a slice boundary of a stair shape in a horizontal direction. However, in connection with the method of configuring a slice in a tile according to an embodiment of the present invention, since a tile have various structures, it may have various types of slice boundaries.

Figure 17:
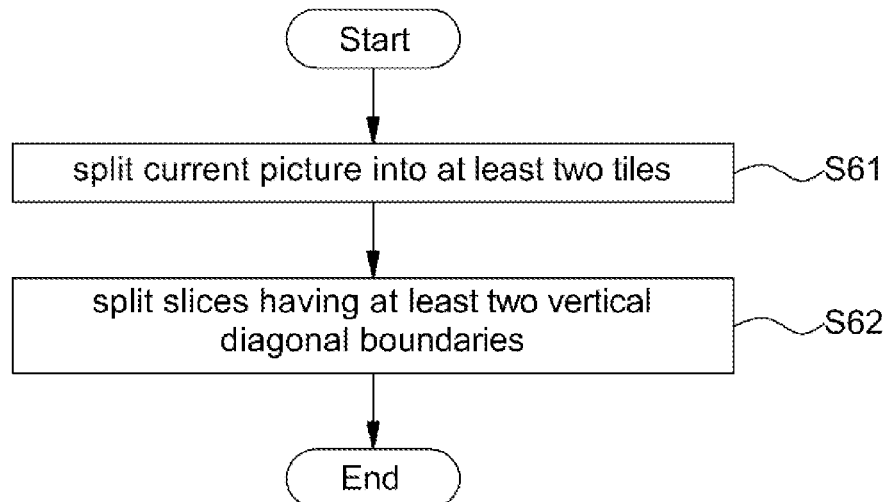
FIG. 17 is a flowchart illustrating a method of configuring a slice in a tile according to an embodiment of the present invention.
Figure 18:
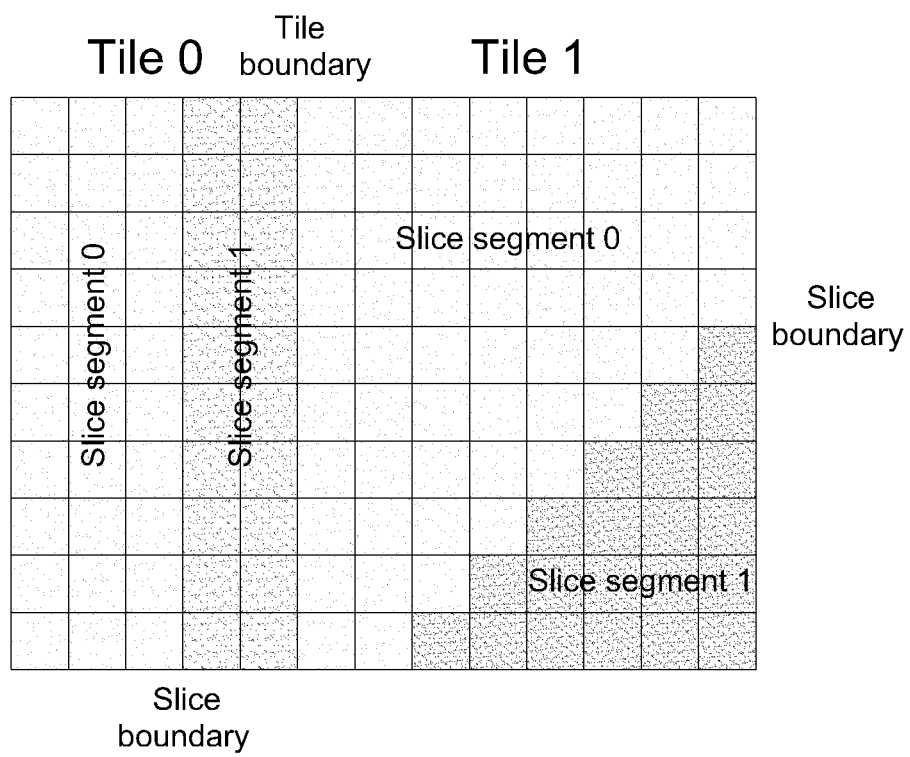
FIG. 18 illustrates a structure of a slice in a tile configured according to the flowchart of FIG. 17.

FIG. 17 is a flowchart illustrating a method of configuring a slice in a tile according to an embodiment of the present invention, and FIG. 18 illustrates a structure of a slice in a tile configured according to the flowchart of FIG. 17.

Referring to FIG. 17 and FIG. 18, a current picture may be split into at least two or more tiles (S61). For example, a current picture may be split into two tiles (TILE 0 and TILE 1). Then, each tile may be split into at least two or more slices (S62). The slices may have vertical boundaries or may be split into diagonal slice boundaries. For example, TILE 0 may be split into Slice segment 0 and Slice segment 1 which are vertical slices with a vertical slice boundary, and TILE 1 may be split into 0 and Slice segment which are diagonally split with a diagonal slice boundary.

In this way, it is possible to efficiently code the current picture according to the characteristics of the image by configuring tiles with slices having various boundaries. In addition, as a scanning method of a coding unit including a coding tree block included in a tile, it is possible to adaptively determine an intra-tile scanning method for each tile.

The scanning method of the tile may be any one of a raster scanning method, a vertical scanning method, a horizontal scanning method, and a diagonal scanning method, and any method other than the scanning methods may be selected. The scanning method of the tile may be dependent on the direction of the slice. For example, when the slice in the tile is split in the vertical direction, the scanning method of the tile may be a vertical scanning method, and when the slice in the tile is split in the diagonal direction, the scanning method of the tile is a raster scanning method. In one embodiment, the scanning method of the tile may be determined independently of the direction of the slice. For example, when the slice in the tile is split in the vertical direction, the scanning method in the tile may be a horizontal scanning method. If the scanning method in the tile is dependent on the split direction of the slice, the coding efficiency of the slice in the tile may be improved.

Figure 19A:
FIG. 19A illustrates a structure of a coding tree block in a tile configured according to a general method, and a scan order thereof.

FIG. 19A illustrates a structure of a coding tree block in a tile configured according to a general method, and a scan order thereof, and FIG. 19B illustrates a scan order of a coding tree block in a plurality of tile structures configured according to a general method.

Figure 19D:
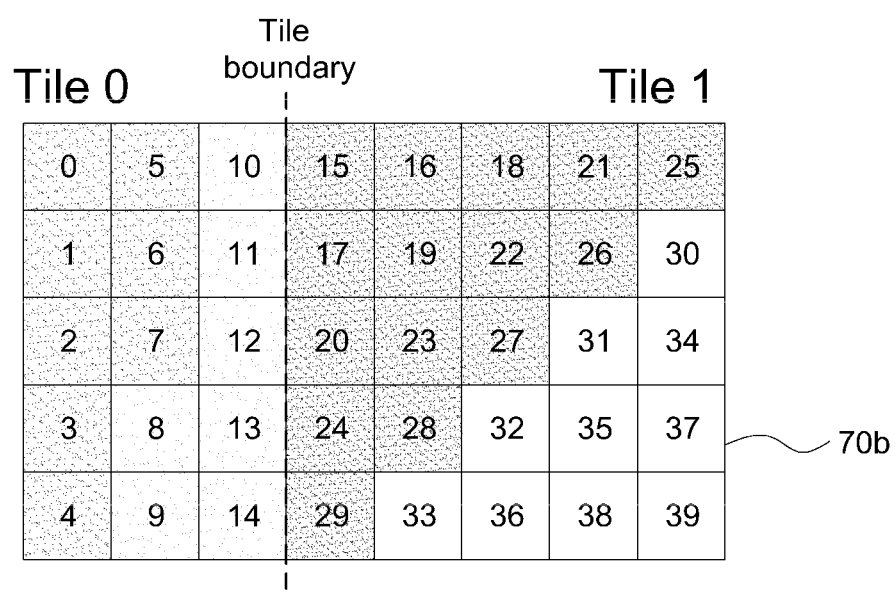
FIG. 19D illustrates various slice structures having an adaptive scan order according to an embodiment of the present invention.

FIG. 19C illustrates a scan order of adaptive intra-tile coding tree blocks according to an embodiment of the present invention, and FIG. 19D illustrates various slice structures having an adaptive scan order according to an embodiment of the present invention.

Referring to FIG. 19A, a current picture 70a in which each of 40 coding tree blocks is composed of 5 lines in a vertical direction and 8 lines in a horizontal direction is scanned by a raster scanning method which is a conventional intra-tile scanning method. In this case, the coding tree blocks scan one row from the top left to the right, and sequentially scan the tree blocks in the right direction from the left coding tree block of the next row. Referring to FIG. 19B, a scanning method when the current picture 70b is split in the vertical direction and composed of two tiles TILE 0 and TILE 1 may be checked.

In this case, according to the conventional intra-tile scanning method, the current picture 70b scans the first tile TILE 0 from the left direction to the right direction of the uppermost row, progressing from the left direction to the right direction of the next row and may scan the coding block unit. In this manner, all the first tiles TILE 0 may be scanned and sequentially scanned while proceeding toward the right direction from the left direction of the uppermost row of the second tile TILE 1 to the lowest right coding block unit. Conventionally, a coding block unit may be scanned by such a raster scanning method regardless of how a tile is constructed. Hereinafter, when a tile according to an embodiment of the present invention is composed of at least one or more slices, the scanning method in the tile will be described.

Referring to FIG. 19C, an intra-tile scanning method according to an embodiment of the present invention may scan a coding unit including a coding tree block by using an intra-tile scanning method adaptively determined for each tile. For example, when the current picture 70c is split into two tiles (TILE 0 and TILE 1) in the vertical direction, the coding units including the coding tree block of the first tile (TILE 0) may be scanned according to the vertical scanning method. In addition, the coding units including the coding tree blocks of the second tile (TILE 1) may be scanned in different ways for each tile, such as a diagonal scanning method. In an embodiment of the present invention, a vertical scanning method and a diagonal scanning method are illustrated as an intra-tile scanning method, but the intra-tile scan direction and order of the present invention are not limited thereto. Also, the intra-tile scanning method according to an embodiment of the present invention may not be the same as the encoding and decoding order of the coding tree block and the coding unit included in the tile.

Referring to FIG. 19D, the slices in a tile according to an embodiment of the present invention may have a variable structure. For example, the current picture 70d may be split into two vertical tiles, and each tile may be composed of two slice regions. The first tile (TILE 0) may be split by using a slice boundary in the form of a staircase extending in the vertical direction, and the first slice may be composed of coding tree blocks having indices of 0 to 7 in the adaptive intra-tile scan order. The second slice of the first tile (TILE 0) may be composed of coding tree blocks having indices of 8 to 14 in the scan order within the tile.

In addition, the second tile (TILE 1) may be split by using a slice boundary extending in the diagonal direction, and the first slice may be composed of coding tree blocks having an indices of 15 to 29 of a scan order in the adaptive tile. The second slice of the second tile (TILE 1) may be composed of coding tree blocks having indices of 30 to 39 in the scan order within the tile.

In one embodiment, the intra-tile scanning method of the present invention may be matched with the scanning method of a coding tree block as shown in FIG. 19A. Since the scan order of the coding tree blocks in the same picture includes the position information of each coding tree block, the information of the decoded coding blocks may be stored in the correct position in the picture. Here, the scan sequence of FIG. 19A is illustrated as a scanning method of a coding tree block matching a scanning method of coding tree blocks in a tile of the present invention, but the present invention is not limited thereto.

For example, referring to FIG. 19D, the information mapping the scan order in which the coding tree blocks constituting the first slice of the first tile (TILE 0) are scanned by using the intra-tile scanning method according to an embodiment of the present invention, and the scan order in which the coding tree blocks are scanned according to a general scanning method may be used. Examples of such mapping are shown in Table 1 below.

TABLE 1

| CtbAddrInAdaptiveTs | CtbAddrInTs | CtbAddrInRs |
| --- | --- | --- |
| 0 | 0 | 0 |
| 1 | 3 | 8 |
| 2 | 6 | 16 |
| 3 | 9 | 24 |
| 4 | 12 | 32 |
| 5 | 1 | 1 |
| 6 | 4 | 9 |
| 7 | 7 | 17 |

CtbAddInAdaptiveTs of Table 1 is the first index and may indicate an index of coding tree blocks according to a scan order of a tile according to an embodiment of the present invention. For example, the first slice of the first tile of FIG. 19D may have a value of 0 to 7 at the first index. CtbAddInTs is a second index and when the entire coding tree block included in each tile is indexed according to the raster scanning method in the horizontal direction as shown in FIG. 19B, the index of the coding tree blocks included in Slice 0 in Tile 0 of FIG. 19D is represented by the index of FIG. 19B. In addition, CtbAddInRs is a third index, and assuming that the current picture is not split into at least two tiles as in FIG. 19A, when the coding block units of the entire current picture are indexed according to a raster scanning method, the index of coding tree blocks included in Slice 0 in Tile 0 of FIG. 19D is expressed as an index of FIG. 19A.

For example, a coding tree block having a value of '6' among the first index may be mapped to the index value '4' of the second index and then mapped to the index value '9' of the third index. Alternatively, a coding tree block having a value of '6' in the first index may be directly mapped to a value of '9' in the third index, and the mapping order and the method thereof are not limited to the present invention. In one embodiment, a slice may constitute a coding tree block within the slice along the first index or the second index. However, the order of decoding the coding tree block is not limited thereto, and may be decoded according to another scanning method.

FIG. 20 is a syntax for constructing a tile having an adaptive scan order according to an embodiment of the present invention.

Referring to FIG. 20, adaptive_ctb_scan_in_tile_flag (71), which is an adaptive tile scan flag indicating whether to use an adaptive tile scanning method for each tile according to an embodiment of the present invention, may be received. When the adaptive tile scan flag is 0, the coding tree blocks in a tile may be scanned by a raster scan, which is a conventional method. If the adaptive tile scan flag is 1, scan_dir_in_tile[i] (72), which is tile scanning method information indicating a tile scanning method, is further received, and the intra-tile coding tree blocks may be scanned according to the tile scanning method indicated by the tile scanning method information. However, the syntax of FIG. 20 is merely an example of a method for scanning a coding tree block and a coding unit in a tile according to an embodiment of the present invention, and the present invention is not limited thereto. In addition, the scanning method can be obtained from a picture parameter set or an upper parameter.

Figure 21A:
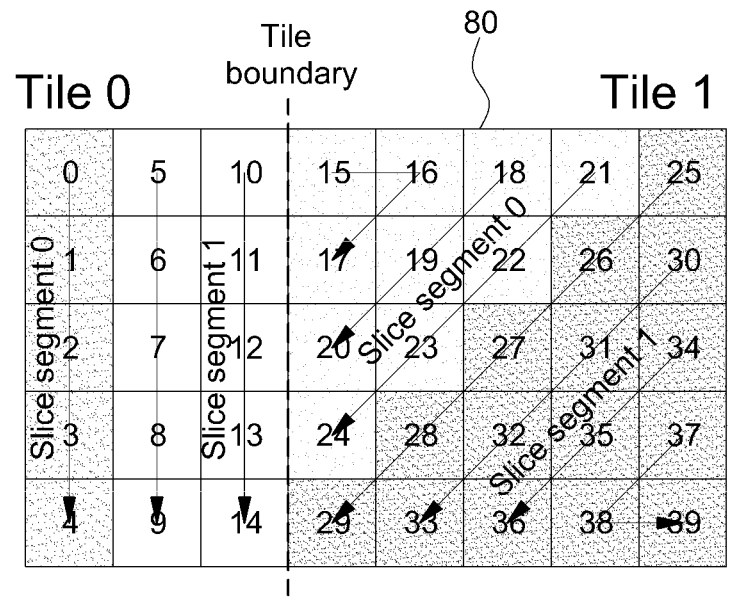
FIG. 21A and FIG. 21B are diagrams illustrating the examples of tile and coding tree blocks with adaptive encoding and decoding order in accordance with an embodiment of the present invention.
Figure 21B:
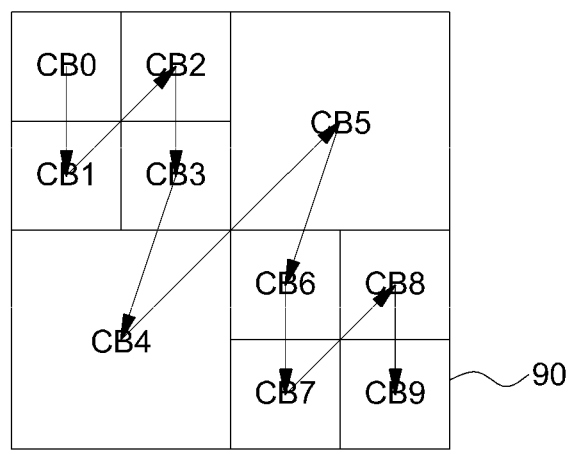

According to the present invention, the coding order of coding tree blocks or coding units included in the current picture is also not limited to the existing method and may be changed in various ways. FIG. 21A and FIG. 21B are illustrations of a tile and a coding tree block with adaptive encoding and decoding order in accordance with an embodiment of the present invention.

Referring to FIG. 21A, an intra-tile encoding and decoding order may be variably applied to each tile region constituting the current picture. Thus, when the tile is composed of two or more slices, the shape of the slice regions may be determined, and the encoding and decoding order of the coding unit including the coding tree blocks in the slice may be determined. However, the encoding and decoding order and method of the coding unit including the coding tree block is not limited thereto.

Referring to FIG. 21B, when the coding tree block of the current picture is split into a plurality of coding blocks, the coding and decoding order of each coding block may be determined using by using N-shaped scanning method (upper left->lower left->upper right->lower right) as well as the Z-shaped scanning method (upper left->upper right->lower left->lower right). The scanning method and the order are not limited thereto.

In one embodiment, the scan order of the coding blocks in the coding tree block may be dependent on or independent of the split direction of the slices in the tile. Referring again to FIG. 21A, for example, since the first tile (TILE 0) is split into slices in the vertical direction, the coding blocks in the coding tree block may be encoded and decoded in the N-direction order reversed up and down. In addition, when the tile is split into slices in the horizontal direction, the coding blocks in the coding tree block may be encoded and decoded in the Z direction.

As such, the method of configuring a tile structure according to an exemplary embodiment of the present invention is split by using a column splitting or a row splitting in which at least two or more tiles included in the current picture are at least one or more split lengths shorter than the vertical or width length of the current picture. Thus, it is possible to configure a tile having a structure of various forms to improve the coding efficiency of the image. Furthermore, according to another embodiment of the present invention, a method of configuring a slice and a scanning method in a tile may increase coding efficiency by determining a boundary of at least two or more slices constituting the tile in a vertical direction or diagonal direction, and a coding efficiency may be improved according to a picture by encoding and decoding a coding tree block or a coding block in the tile according to an adaptive encoding and decoding order for each tile.

The present invention described above is not limited to the above-described embodiment and the accompanying drawings, and it will be apparent to those having a common knowledge in a related art that various substitutions, modifications, and changes are possible within the scope without departing from the technological spirits of the present invention.

What is claimed is:

1. A method for constructing a tile structure, wherein a current picture includes at least two or more tiles, the at least two or more tiles are splitted by a column splitting or a row splitting,
   wherein the at least two or more of the splitted tiles are merged to form the tile structure,
   wherein the merging of the at least two or more tiles is determined based on merge number information indicating how many tiles are merged among the splitted tiles,
   wherein the at least two or more tiles is splitted based on tile usage flag indicating whether the current picture is splitted into at least two or more tiles.

2. The method of claim 1, wherein the merging of the at least two or more tiles is determined based on tile merge flag.

3. The method of claim 1, wherein the merge number information indicates a number of tiles to be merged in row direction or column direction.

* * * * *